United States Patent
Reichardt et al.

[11] Patent Number: 5,872,353
[45] Date of Patent: Feb. 16, 1999

[54] CHIP CARD READING DEVICE

[75] Inventors: Manfred Reichardt, Weinberg; Bernd Schuder, Schwaigern, both of Germany

[73] Assignee: Amphenol-Tuchel Electronics GmbH, Heilbronn, Germany

[21] Appl. No.: 643,949

[22] Filed: May 7, 1996

[30] Foreign Application Priority Data

May 9, 1995 [DE] Germany .................. 195 16 987.5

[51] Int. Cl.$^6$ .................................................. G06K 7/06
[52] U.S. Cl. ................................ 235/441; 235/492
[58] Field of Search ............................... 235/441, 492

[56] References Cited

U.S. PATENT DOCUMENTS

| | | | |
|---|---|---|---|
| 3,917,372 | 11/1975 | Selinko | 339/75 M |
| 4,236,667 | 12/1980 | Crowley et al. | 235/443 |
| 4,288,140 | 9/1981 | Griffith et al. | 339/74 R |
| 4,575,703 | 3/1986 | Shishido | 235/479 |
| 4,717,817 | 1/1988 | Grassi et al. | 235/441 |
| 4,724,310 | 2/1988 | Shimamura et al. | 235/483 |
| 4,734,567 | 3/1988 | Hansbauer | 235/482 |
| 4,735,578 | 4/1988 | Reichardt et al. | 439/152 |
| 4,752,234 | 6/1988 | Reichardt et al. | 439/260 |
| 4,770,639 | 9/1988 | Lau | 439/61 |
| 4,795,897 | 1/1989 | Chalendard | 235/482 |
| 4,799,891 | 1/1989 | Reichardt et al. | 439/43 |
| 4,814,593 | 3/1989 | Reichardt et al. | 235/482 |
| 4,874,323 | 10/1989 | Shibano | 439/260 |
| 4,900,273 | 2/1990 | Pernet | 439/630 |
| 4,932,889 | 6/1990 | Bleier et al. | 439/260 |
| 4,975,086 | 12/1990 | Reichardt et al. | 439/629 |
| 4,976,630 | 12/1990 | Schuder et al. | 439/630 |
| 5,196,680 | 3/1993 | Schuder | 235/449 |
| 5,198,645 | 3/1993 | Martin et al. | 235/441 |
| 5,259,777 | 11/1993 | Schuder et al. | 439/188 |
| 5,269,707 | 12/1993 | Reichardt et al. | 439/630 |
| 5,320,552 | 6/1994 | Reichardt et al. | 439/331 |
| 5,334,034 | 8/1994 | Reichardt et al. | 439/188 |
| 5,334,827 | 8/1994 | Bleier et al. | 235/492 |
| 5,336,877 | 8/1994 | Raab et al. | 235/475 |
| 5,369,259 | 11/1994 | Bleier et al. | 235/441 |

FOREIGN PATENT DOCUMENTS

| | | |
|---|---|---|
| 139 593 | 5/1985 | European Pat. Off. . |
| 0 186 737 | 7/1986 | European Pat. Off. . |
| 214 478 | 3/1987 | European Pat. Off. . |
| 0 254 316 | 1/1988 | European Pat. Off. . |
| 274 534 | 7/1988 | European Pat. Off. . |
| 316 699 | 5/1989 | European Pat. Off. . |
| 0 333 530 | 9/1989 | European Pat. Off. . |
| 2 489 558 | 3/1982 | France . |
| 2 607 287 | 5/1988 | France . |
| 2 633 750 | 1/1990 | France . |
| 2952442 A1 | 7/1980 | Germany . |
| 3343727 A1 | 6/1985 | Germany . |
| 3343757 A1 | 6/1985 | Germany . |
| 3402632 A1 | 8/1985 | Germany . |
| 3443561 A1 | 5/1986 | Germany . |
| 3531318 A1 | 3/1987 | Germany . |
| 36 02 668 A1 | 7/1987 | Germany . |
| 3625306 A1 | 1/1988 | Germany . |
| 3442397 A1 | 5/1988 | Germany . |
| 38 08 183 | 9/1988 | Germany . |
| 3810275 A1 | 10/1989 | Germany . |
| 3832588 A1 | 3/1990 | Germany . |
| 3931506 A1 | 4/1991 | Germany . |

*Primary Examiner*—Harold Pitts
*Attorney, Agent, or Firm*—Bacon & Thomas

[57] ABSTRACT

A chip card reading device for chip cards and/or SIM cards having different thicknesses is provided, comprising a frame, a receptacle within said frame, contact elements, first spring means for providing a contacting force of said contacting elements against contact pads on a chip card when said chip card is inserted, and second spring means for pressing said chip card against a bearing surface of said chip card reading device wherein said second spring means provide a spring force in excess of the contacting force provided by said first spring means.

17 Claims, 7 Drawing Sheets

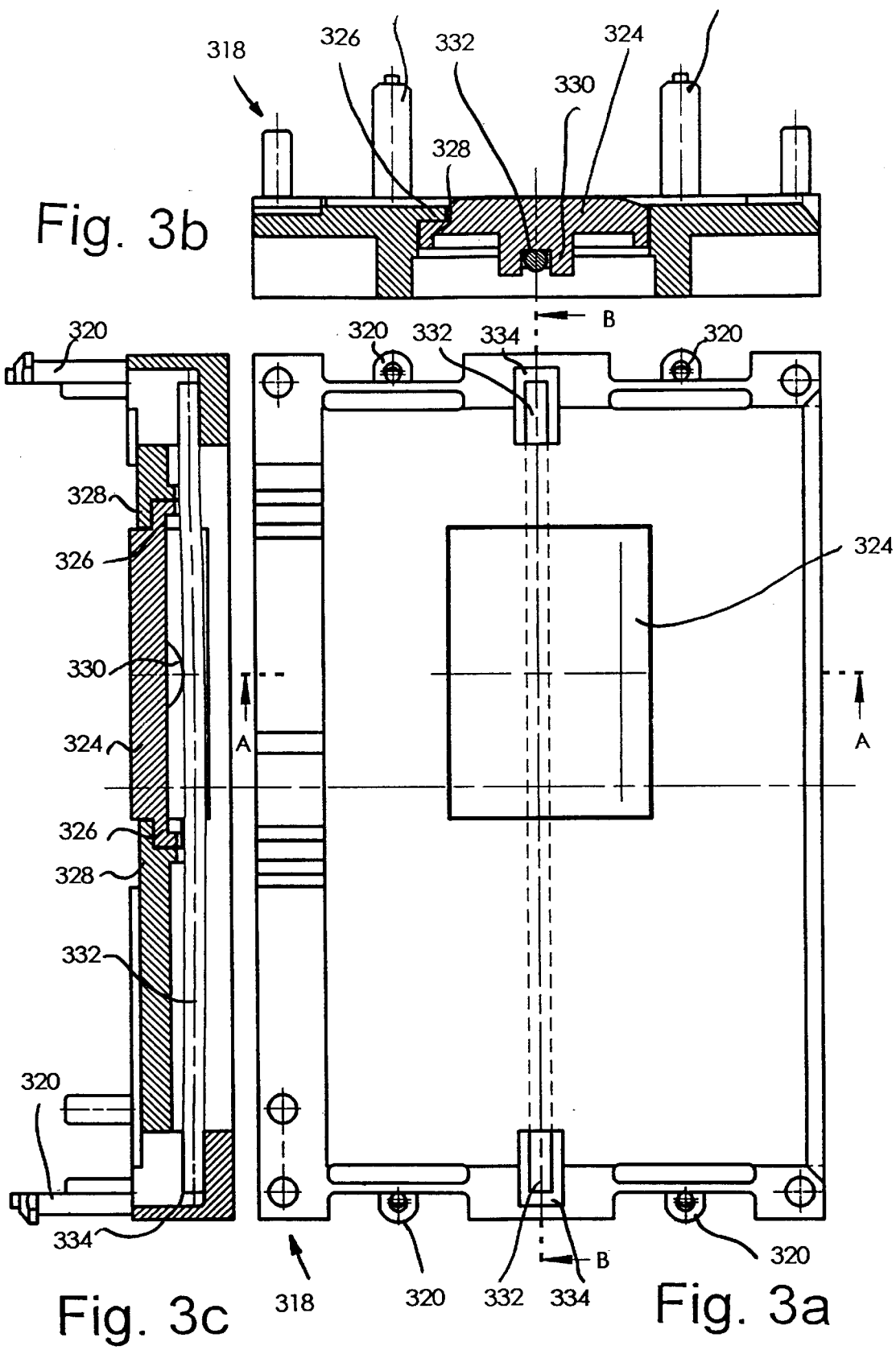

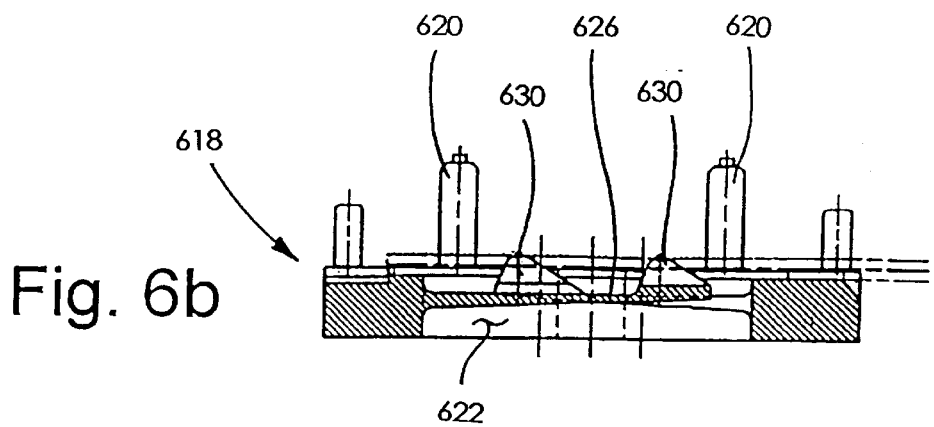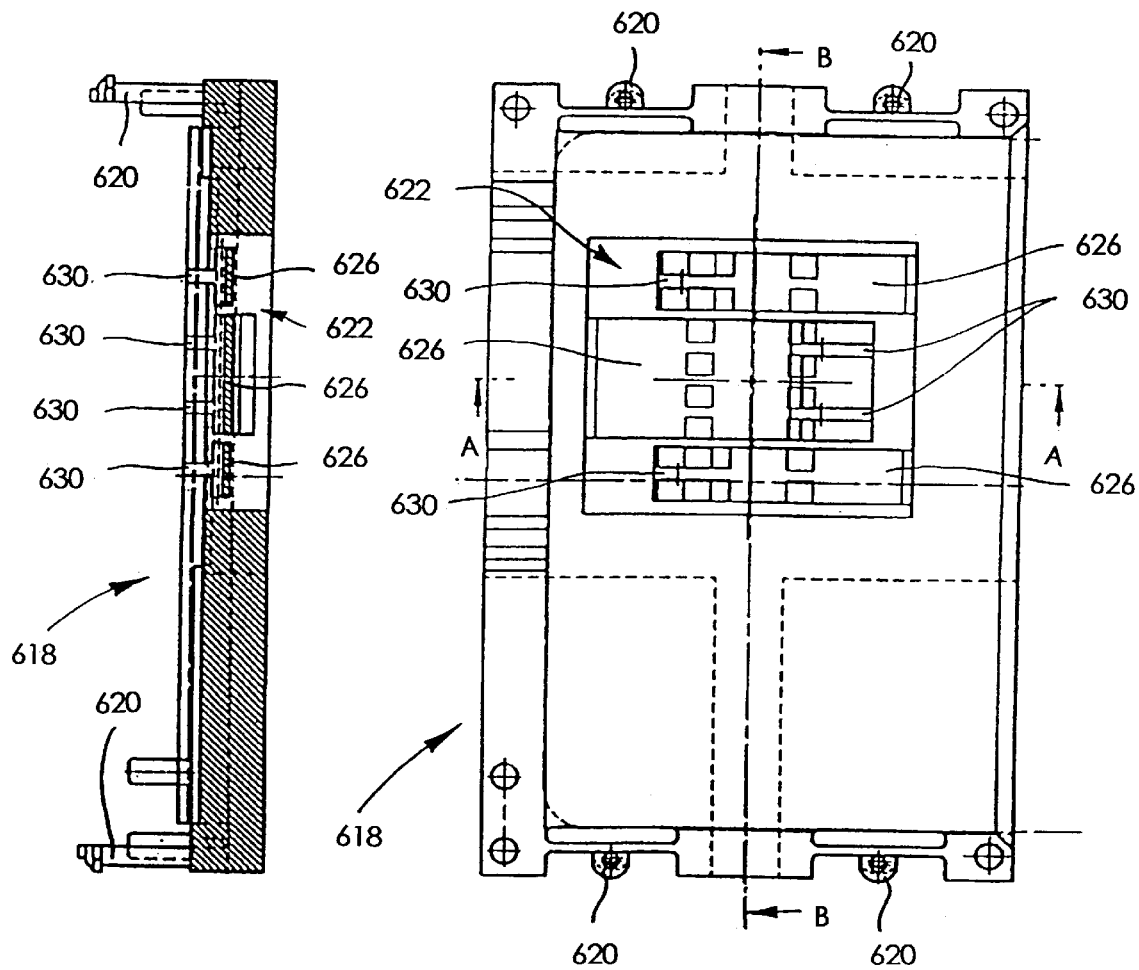
Fig. 6b
Fig. 6c
Fig. 6a

CHIP CARD READING DEVICE

FIELD OF THE INVENTION

The present invention relates to a chip card reading device and in particular to a chip card reading device for chip cards and/or SIM cards having different thicknesses.

BACKGROUND OF THE INVENTION

Chip card reading devices are also known in the art as CCAD (chip card acceptor devices). These chip card reading devices can accept either chip cards having a standard thickness or having twice said standard thickness, i.e. double thickness. A chip card reading device adapted to read chip cards of different thicknesses is presently not known.

The receptacle of chip card reading devices for standard thickness cards is too narrow to accept also cards having double thickness. Chip card reading devices for double thickness cards can accept cards having the standard thickness, however, contacting problems arise in this case. If the difference in thickness of the chip cards is to be accommodated by elastic contacting elements of the chip card reading device, due to the larger amount of bending of the contacting elements and the larger required displacement thereof, it is not possible to keep the contacting force of the contacting elements on the corresponding contact pads of the chip card within the allowable range of 0.3 to 0.5N.

U.S. Pat. No. 5,012,078 discloses an IC card reader which comprises a rocking lever including a central pivot, an actuating cam on one side of the pivot and against which a card being inserted comes to bear at the end of its insertion stroke, thereby pivoting the lever from a rest position to a pressure-applying position, a pressure cam on the other side of the pivot for bearing against the card when the rocking lever is in its pressure-applying position, thereby bending the card towards the contact elements, and resilient return means returning the rocking lever to its rest position when it is not engaged by a card inserted in the reader. This reference does not consider cards having different thicknesses. Further, the stresses and strains imposed on the card when bent by said cam in the reading position will lead to premature failure of the contact pads and/or the circuit comprised on the card.

German Patent Application DE 43 36 192 shows a chip card reading device in which a rocking lever similar to the one disclosed in the above U.S. patent is actuated by a card being inserted into the chip card reader. An actuating cam of the rocking lever acts on the contacting elements of the reader to press them against the the card. This reference does not consider cards having different thicknesses either. If cards of different thicknesses were used with this card reader, it would not be possible to keep the contacting force of the contacting elements on the corresponding contact patches of the chip card within the allowable range of 0.3 to 0.5N.

Finally, German Utility Model No. G 94 00 348 discloses a chip card reader which comprises a frame, a movable carrier within said frame for receiving the chip card, a lever pivotably mounted on said frame and comprising a pressure plate at one end thereof and a cam track, and a stationary roller cam rotatably mounted on said frame. Upon insertion of a chip card into said reader, the chip card moves the carrier within the frame causing the roller cam to ride on the cam track of the lever thereby pivoting the lever and pressing the pressure plate against the inserted chip card, which is thus pressed against contacting elements mounted on said carrier. Apart from the complexity of the mechanism which adds to manufacturing cost and is prone to wear and failure, this chip card reader cannot be used for chip cards of different thicknesses since mutual arrangement of the carrier, the roller cam and the lever allows proper functioning of the card reader only with a chip card having a fixed predetermined thickness.

It is thus the object of the present invention to provide a chip card reading device adapted to receive chip cards having standard or double thicknesses, i.e. a thickness in the range of about 0.72 mm to about 1.68 mm, with the contacting force of the contacting elements of the reader on the contact pads of the card being kept within the allowable range of about 0.3 to about 0.5N in the reading position of the chip card.

THE PRESENT INVENTION

Since the given geometry of a chip card reader does not allow for contacting elements making up the difference of travel for chip cards of different thicknesses as specified above and at the same time keeping with the requirements for the contacting force, according to the present invention, a chip card reading device comprises a frame, a receptacle within said frame, contact elements, first spring means for providing a contacting force of said contacting elements against contact pads on a chip card when said chip card is inserted, and second spring means for pressing said chip card against a bearing surface of said chip card reading device wherein said second spring means provide a spring force in excess of the contacting force provided by said first spring means.

According to a more general aspect of the invention, a chip card reading device comprises housing means, a cavity within said housing means for receiving a chip card, contact elements, and resilient means for pressing a chip card against said contact elements.

According to another aspect of the invention, a chip card reading device for chip cards and/or SIM cards having different thicknesses comprises a frame, a receptacle within said frame, contact elements, and a pressure means for pressing a chip card against said contact elements, wherein said pressure means is a resilient pressure plate or a spring-biased pressure plate.

According to another aspect of the invention, a chip card reading device for chip cards and/or SIM cards having different thicknesses, comprises a frame, a receptacle within said frame, contact elements, and a resilient pressure means for pressing a chip card against said contact elements.

According to another aspect of the invention, a chip card reading device for chip cards and/or SIM cards having different thicknesses comprises a frame, a receptacle within said frame, and contact elements, wherein said contact elements are mounted to said frame and protrude into said receptacle, when no chip card is inserted, wherein the contact elements are resiliently displaced when a chip card is inserted to provide a contacting force of the contacting elements against contact pads on said chip card, said contacting force being within a predetermined allowable range, wherein a bearing surface is provided on said frame against which the chip card can bear and which limits the displacement of the contact elements, and wherein resilient pressure means are provided for pressing said chip card against said bearing surface independently from the thickness of the chip card so that said chip card abuts said bearing surface.

Preferred embodiments may be gathered form the dependent claims.

BRIEF DESCRIPTION OF THE DRAWINGS

The foregoing and other features of the present invention will become apparent to on skilled in the art to which the present invention relates upon consideration of the following description of preferred embodiments the invention with reference to the accompanying drawings, wherein:

FIG. 3a is bottom plan view of a cover of a chip card reading device according to a third embodiment of the present invention;

FIG. 3b is a sectional view of the cover, taken along line A—A in FIG. 3a;

FIG. 3c is a sectional view of the cover, taken along line B—B in FIG. 3a;

FIG. 4b is a side view of the chip card reading device of FIG. 4a;

FIG. 6a is bottom plan view of a cover of a chip card reading device according to another embodiment of the present invention;

FIG. 6b is a sectional view of the cover, taken along line A—A in FIG. 6a;

FIG. 6c is a sectional view of the cover, taken along line B—B in FIG. 6a;

FIG. 7b is a sectional view taken along line A—A in FIG. 7a.

BEST MODE FOR CARRYING OUT THE INVENTION

Figure 1A:
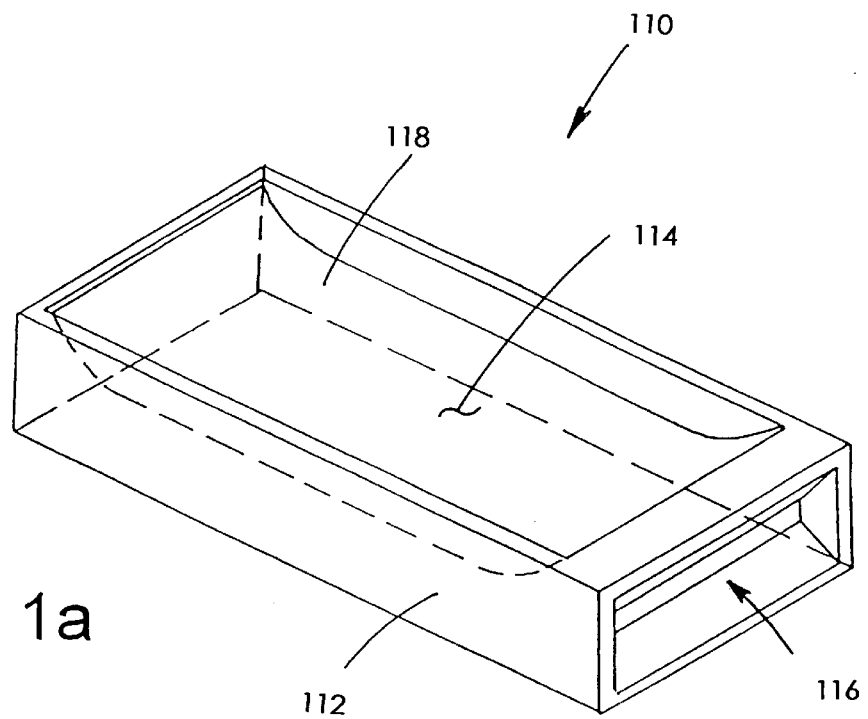
FIG. 1a is a perspective view of a first embodiment of the present invention.
Figure 1B:
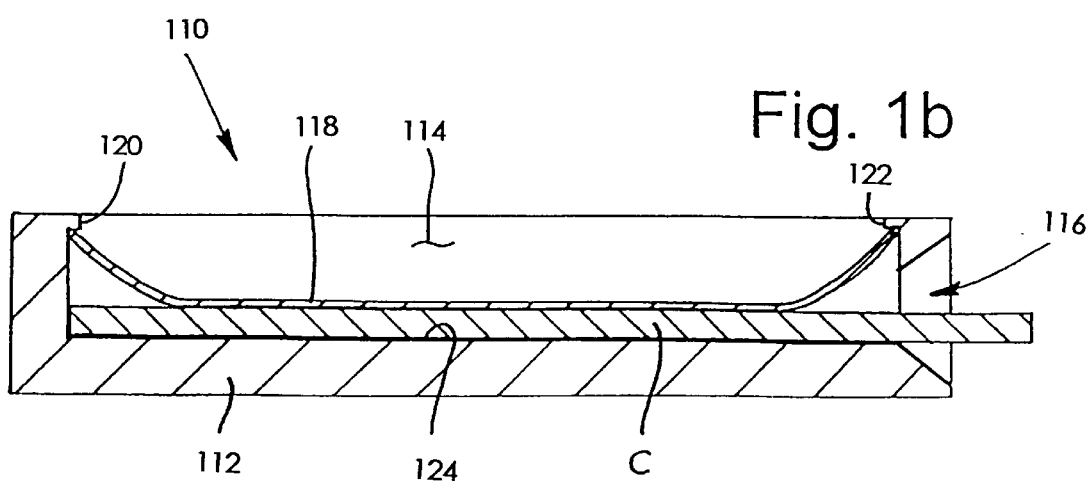
FIG. 1b is a sectional view of the chip card reading device of FIG. 1a with a chip card being inserted.

Taking reference to FIGS. 1a and 1b, a first embodiment of the invention is shown. A reading device 110 comprises a frame 112 having an upward facing opening 114 therein, and an insert slot 116 for a card C. The card C is preferably a so-called IC card or chip card usually having a standard format of about 54 mm×86 mm (also known as credit card format), or it could be a (smaller) SIM card. On one main surface of such a card, contact pads are provided which may be contacted by contact elements, hereinafter also referred to simply as contacts, provided in said reading device 110. Opening 114 is generally covered by an elastic cover 118 which engages projections or flanges 120, 122 on said frame 112 and which is thus secured within the frame 112. As shown in FIG. 1b, the cover 118 together with a bearing surface 124 of said frame 112 forms a receptacle for the card, said cover 118 pressing said card C, when inserted, against said bearing surface 124.

The bearing surface 124 is substantially planar and comprises an opening through which said contact elements (not shown) may extend. Preferably, the contact elements are contact springs which resilient in a direction perpendicular to bearing surface 124, said contact springs crossing the plane of the bearing surface 124 and projecting into the receptacle. The cover 118 is made of spring steel or resilient sheet metal and is preferably coated with an electrically insulating material. The spring characteristics of cover 118 are chosen such that a chip card C having standard or double thickness may be inserted into the chip card reading device 110 and will be pressed against bearing surface 124 by said cover 118. In order to accommodate tolerances, a range of about 0.72 to 0.68 mm is preferred for the allowable thickness of chip cards. When the chip card C abuts the bearing surface 124, contact pads provided on said chip card are pressed against said contacts of said reading device 110 applying a force of about 0.3 to 0.5N. Thus, the chip card reading device according to the present invention ensures a contacting force within the allowable range irrespective of the thickness of the chip card used. Although not shown in the drawings, a stop may be provided in the receptacle of the chip card reading device 110 in order to provide a minimum gap inside said receptacle when no chip card is inserted. This stop could be provided by a step on one or both longitudinal sides of the receptacle, said step being raised with respect to the bearing surface 124 and leaving a slot with a width corresponding to the width of a chip card to be inserted such that a cover being slightly wider than a chip card comes to rest on said step when no chip card is inserted. The height of the stop would, of course, be slightly less than the minimum thickness of a chip card to be inserted.

Figure 2A:
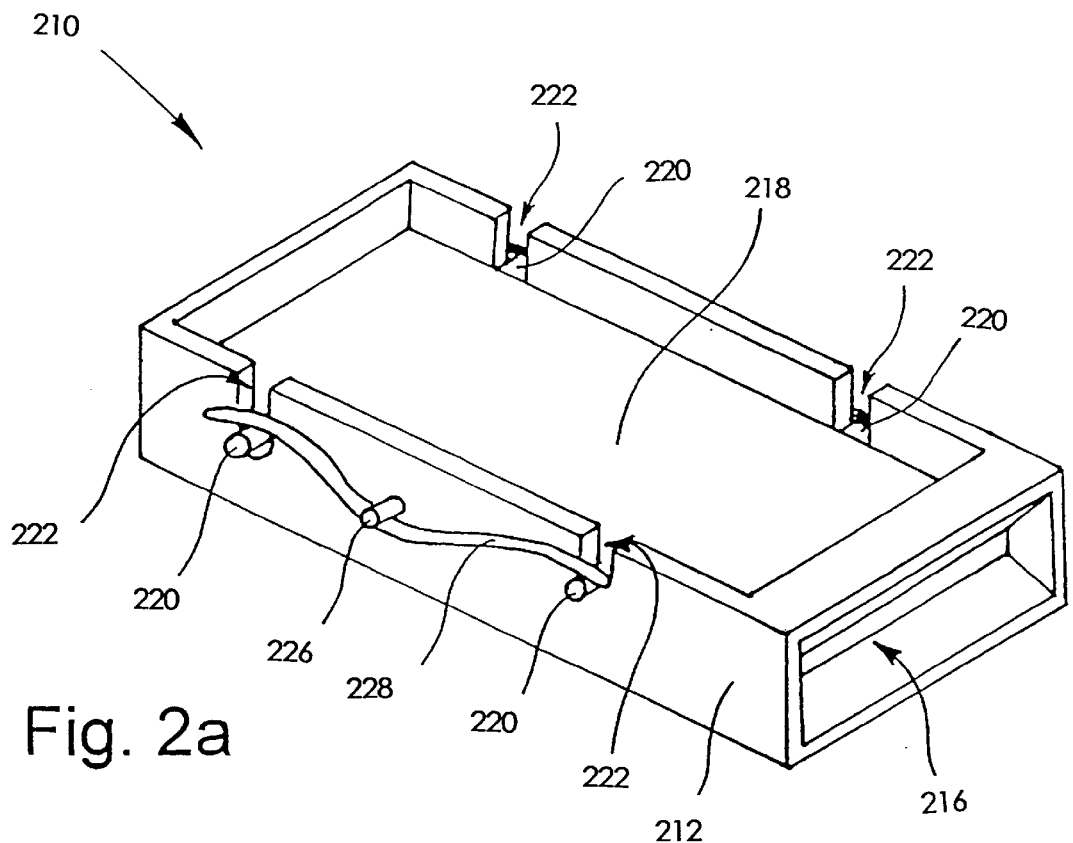
FIG. 2a is a perspective view of a second embodiment of the present invention.
Figure 2B:
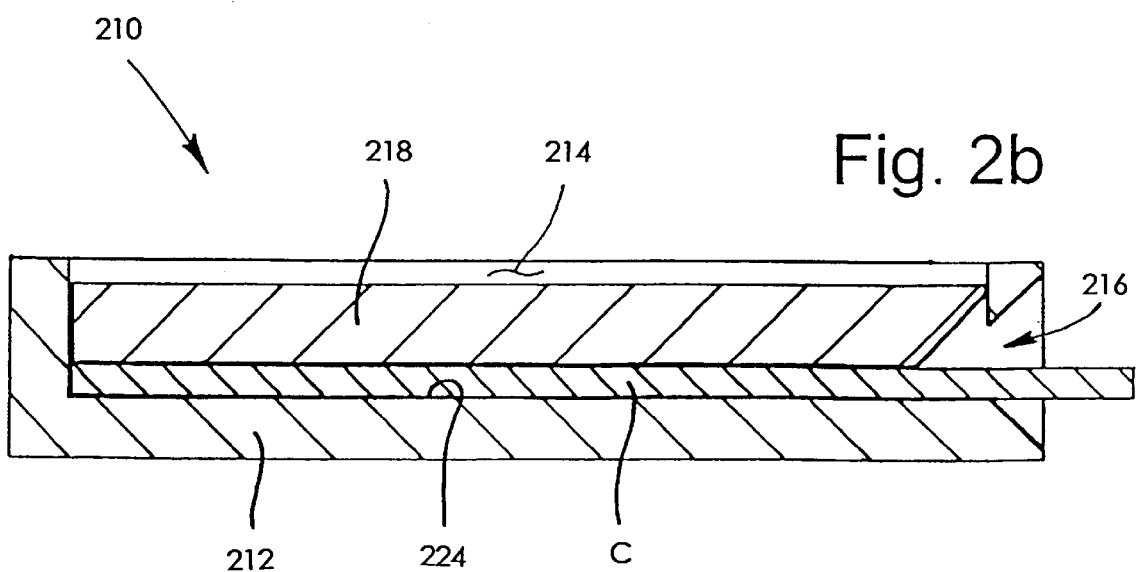
FIG. 2b is a sectional view of the chip card reading device of FIG. 2a with a chip card being inserted.

FIGS. 2a and 2b depict a second embodiment of the present invention. Here, a chip card reading device 210 comprises a frame 212 having an upward facing opening 214 therein, and an insert slot 216 for a card C. The opening 214 is substantially covered by a cover 218, said cover 218 comprising lateral projections or guide pins 220 which are guided in recesses 222 in said frame and which project through the frame to the exterior thereof. Approximately centered between said projections 220 of said cover 218, a further projection 226 is provided on each lateral side of said frame. A spring means such as a spring rod or leaf spring 228 is introduced between the projections 220, 226 such that the cover 218 is pressed downwardly, i.e. towards the bearing surface 224. As is shown in FIG. 2b, the cover 218 forms a receptacle together with the bearing surface 224 of the frame and presses said card C, when inserted, against said bearing surface 224 and the contacts (not shown) of the chip card reading device 210. The cover 218 may be made of any suitable material and is preferably made of plastic. At its end facing the insert slot 216 the cover 218 is provided with a ramp or chamfer to facilitate inserting of the chip card C. As described above with respect to FIGS. 1a and 1b, a stop (not shown) may be provided in the receptacle of the chip card reading device 210 in order to provide a minimum gap inside the receptacle when no chip card is inserted. The spring characteristics of the spring means 228 are chosen such that a chip card C having standard or double thickness may be inserted into the chip card reading device 210 and will be pressed against bearing surface 224 by said cover 218. When the chip card C abuts the bearing surface 224, contact: pads provided on said chip card are pressed against said contacts of said reading device 210 applying a force of about 0.3 to 0.5N. Thus, also this embodiment of a chip card reading device according to the present invention ensures a contacting force within the allowable range irrespective of the thickness of the chip card used.

FIGS. 3a–3c show a cover for a chip card reading device according to another embodiment of the present invention. Contrary to the preceding embodiments, here the cover 318 is releasably fixed to the frame (not shown) of the chip card reading device by means of detent teeth 320 of the cover 318. The cover 318 comprises an opening 322 in which a pressure plate 324 is disposed. The pressure plate 324 extends through said cover 318 into the receptacle. A movement of said pressure plate 324 into said receptacle is limited by a flange 326 on said cover 318 which comes into engagement with a corresponding flange 328 on said pressure plate 324. On the side of the pressure plate 324 facing away from the receptacle, a projection or a guide means 330 is provided. A spring rod 332 engages and is guided by said projection 330. The ends of said spring rod 332 are inserted in recesses 334 in said cover 318 in order to hold said spring rod 332.

When a chip card is inserted into a chip card reading device having the above described cover, said pressure plate 324 is forced out of the receptacle according to the thickness of the chip card and applies a pressure on to the chip card caused by the spring rod 332. A chip card C having standard or double thickness may be inserted into will be press reading device and will be pressed by the pressure plate 324 against the bearing surface of the chip card reading device. The spring characteristics of the spring rod 332 are chosen such that the chip card is pressed against the bearing surface of the chip card reading device resulting in a contact force of 0.3 to 0.5N between the contact pads of the chip card C and the contacts of the chip card reading device. Thus, a contacting force within the allowable range is achieved with the cover 318 of this embodiment. At its end facing the insert slot of the chip card reading device the pressure plate 324 is provided with a ramp or chamfer to facilitate inserting of a chip card C.

It should be noted that in the embodiment shown in FIG. 3a the chip card is inserted from right to left. Therein, only a part of said chip card comprising the contact pads is inserted into the chip card reading device. The rest of the card extends out of the chip card reading device. However, it should be understood that a cover according to the embodiment of FIG. 3 could as well be used in a chip card reading device as described in connection with FIGS. 1 and 2.

Figure 4C:
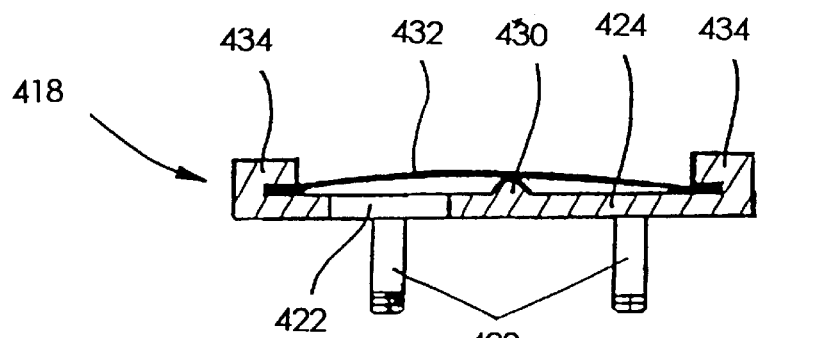
FIG. 4c is a sectional view taken along line A—A in FIG. 4a with only the cover being shown.
Figure 4B:
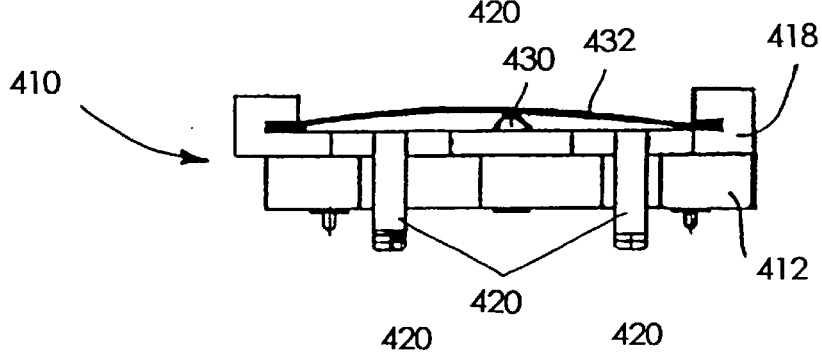
Figure 4A:
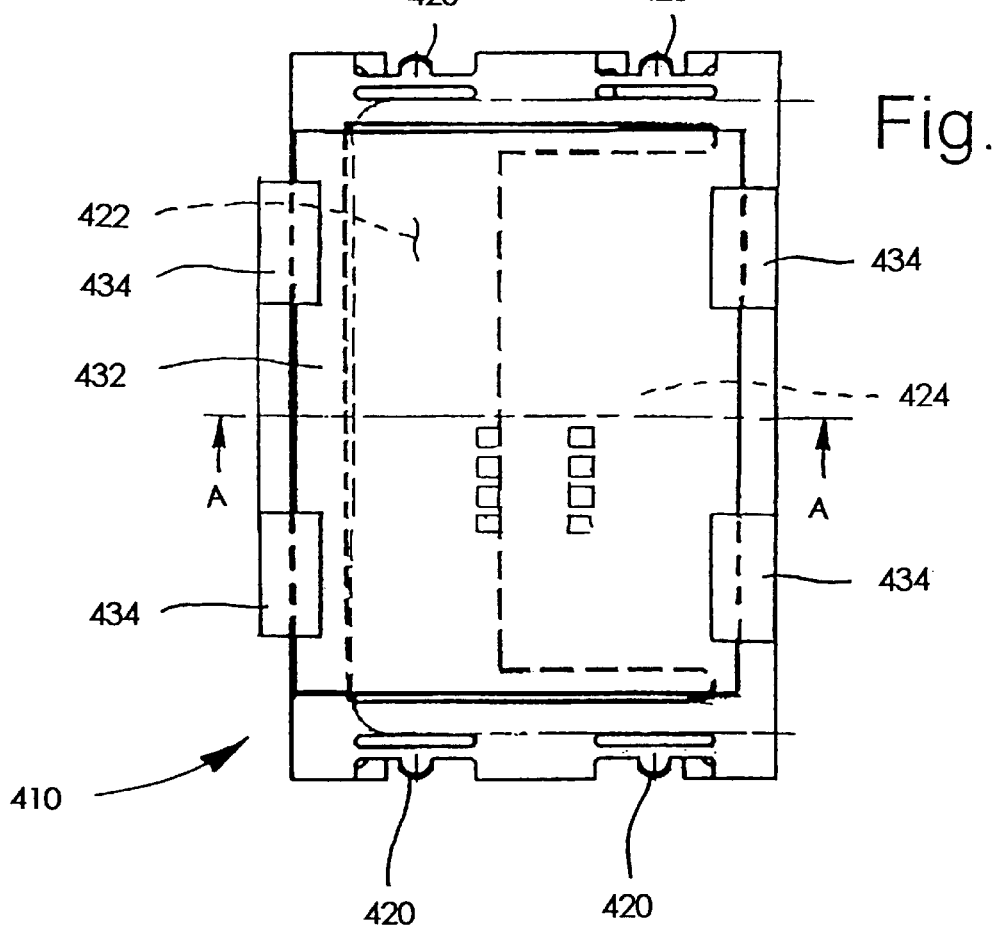
FIG. 4a is a top plan view of a chip card reading device according to another embodiment of the present invention.

FIGS. 4a–4c illustrate another embodiment of a cover according to the present invention. This cover is similar to the one shown in FIGS. 3a–3c. Here, cover 418 is releasably fixed to the frame (not shown) of the chip card reading device by means of detent teeth 420 of the cover 418. The cover 418 comprises a recess 422 defining a pressure plate 424 which is integrally formed with said frame. On the side of the pressure plate 424 facing away from the receptacle, a projection 430 is provided. A resilient plate 432 extends over said projection 430 and is held with its edges in recesses or clamps 434 of the cover 418.

When a chip card is inserted into a chip card reading device having the above described cover, said pressure plate 424 is forced out of the receptacle according to the thickness of the chip card and applies a pressure on to the chip card caused by the resilient plate 432. A chip card C having standard or double thickness may be inserted into the chip card reading device and will be pressed by the pressure plate 424 against the bearing surface of the chip card reading device. The spring characteristics of the resilient plate 432 are chosen such that the chip card is pressed against the bearing surface of the chip card reading device resulting in a contact force of 0.3 to 0.5N between the contact pads of the chip card C and the contacts of the chip card reading device. Thus, a contacting force within the allowable range is achieved with the cover 418 of this embodiment. At its end facing the insert slot of the chip card reading device the pressure plate 424 is provided with a ramp or chamfer to facilitate inserting of a chip card C.

It should be noted that in the embodiment shown in FIG. 4 the chip card is inserted from right to left. Therein, only a part of said chip card comprising the contact pads is inserted into the chip card reading device. The rest of the card extends out of the chip card reading device. However, it should be understood that a cover according to the embodiment of FIG. 4 could as well be used in a chip card reading device as described in connection with FIGS. 1 and 2.

Figure 5A:
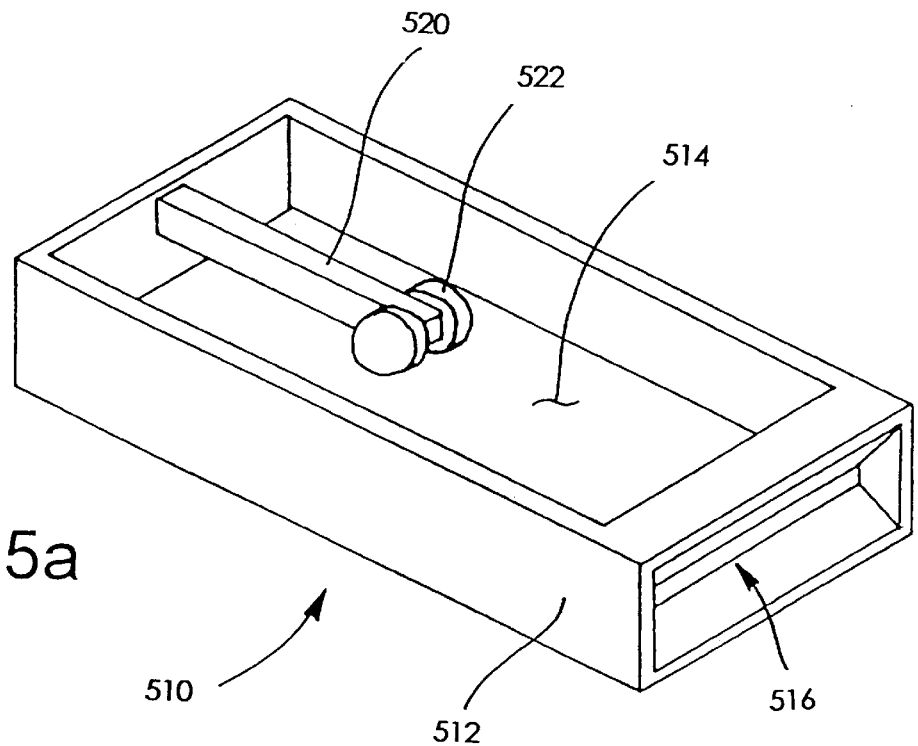
FIG. 5a is a perspective view of another embodiment of the present invention comprising an elastic arm.
Figure 5B:
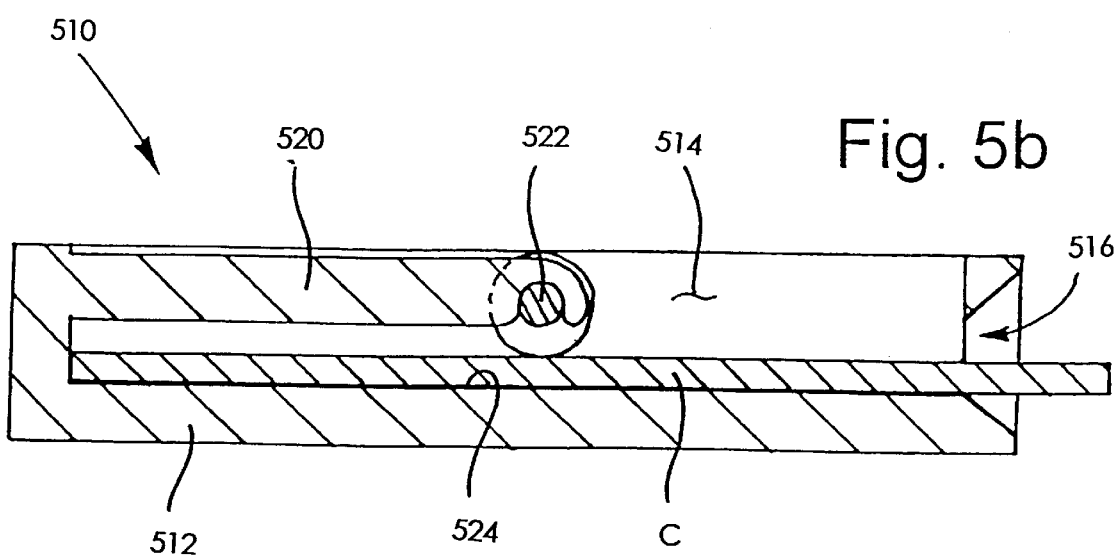
FIG. 5b is a sectional view of the chip card reading device of FIG. 5a with a chip card being inserted.

In FIGS. 5a and 5b, there is shown another embodiment of the present invention similar to the one shown in FIGS. 1 and 2. The chip card reading device 510 comprises a frame 512 having an upward facing opening 514 therein, and an insert slot 516 for a chip card C. A resilient arm 520 protrudes into the opening 514 and, thus, into a receptacle for said chip card C formed by said frame 512 and said opening 514. Said resilient arm 520 is attached to said frame 512, and is preferably formed integrally with said frame 512. At the distal end of said resilient arm 520 a pressure roller 522 is rotatably mounted. The resilient arm 520 presses an inserted chip card C against a bearing surface 524 and the contacts (not shown) of said chip card reading device. The spring characteristics of said resilient arm 520 are chosen such that a chip card C having standard or double thickness may be inserted into the chip card reading device 510 and will be pressed against bearing surface 524 by said resilient arm 520. When the chip card C abuts the bearing surface 524, contact pads provided on said chip card are pressed against said contacts of said reading device 510 applying a force of about 0.3 to 0.5N. Thus, also this embodiment a contacting force within the allowable range irrespective of the thickness of the chip card used.

FIGS. 6a–6c illustrate another embodiment of a cover according to the present invention. This cover is similar to the one shown in FIGS. 3a–3c. Here, cover 618 is also releasably fixed to the frame (not shown) of the chip card reading device by means of detent teeth 620 of the cover 618. The cover 618 comprises a recess 622 in the area where the contact elements are disposed in the assembled condition of the chip card reading device. One or more resilient arms 626 formed integrally with said cover 618 extend into said recess. At the distal end of each of said resilient arms 626 a projection or boss 630 is formed facing towards the receptacle of the chip card reading device in the assembled condition.

When a chip card is inserted into a chip card reading device having the above described cover, said resilient arms 626 are forced out of the receptacle according to the thickness of the chip card and apply a pressure on to the chip card C. A chip card C having standard or double thickness may be inserted into the chip card reading device and will be pressed against the bearing surface of the chip card reading device by the resilient arms 626. The spring characteristics of the resilient arms 626 are chosen such that the chip card is pressed against the bearing surface of the chip card reading device resulting in a contact force of 0.3 to 0.5N between the contact pads of the chip card C and the contacts of the chip card reading device. Thus, a contacting force within the allowable range is achieved with the cover 618 of this embodiment.

It should be noted that in the embodiment shown in FIG. 6 the chip card is inserted from right to left. Therein, only a part of said chip card comprising the contact pads is inserted into the chip card reading device. The rest of the card extends out of the chip card reading device. However, a man skilled in the art could easily modify the cover 618 of this embodiment so it can be used in a chip card reading device as described in connection with FIGS. 1, 2 or 5.

Figure 7B:
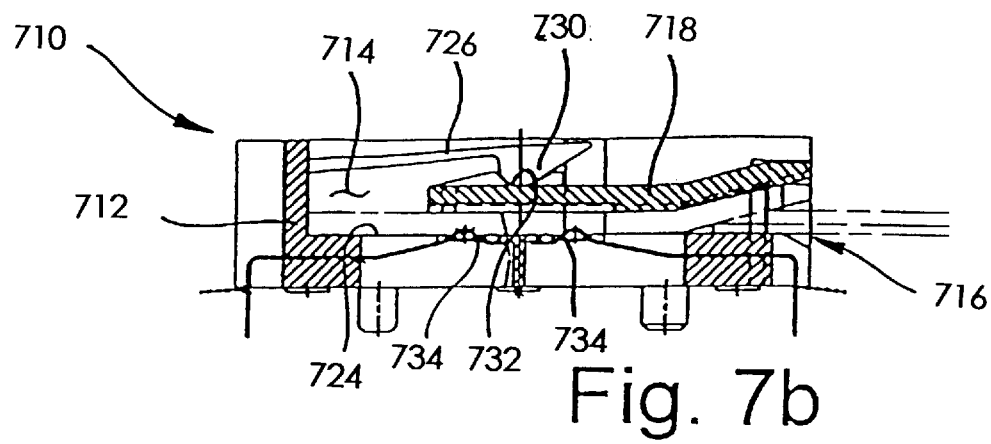
Figure 7A:
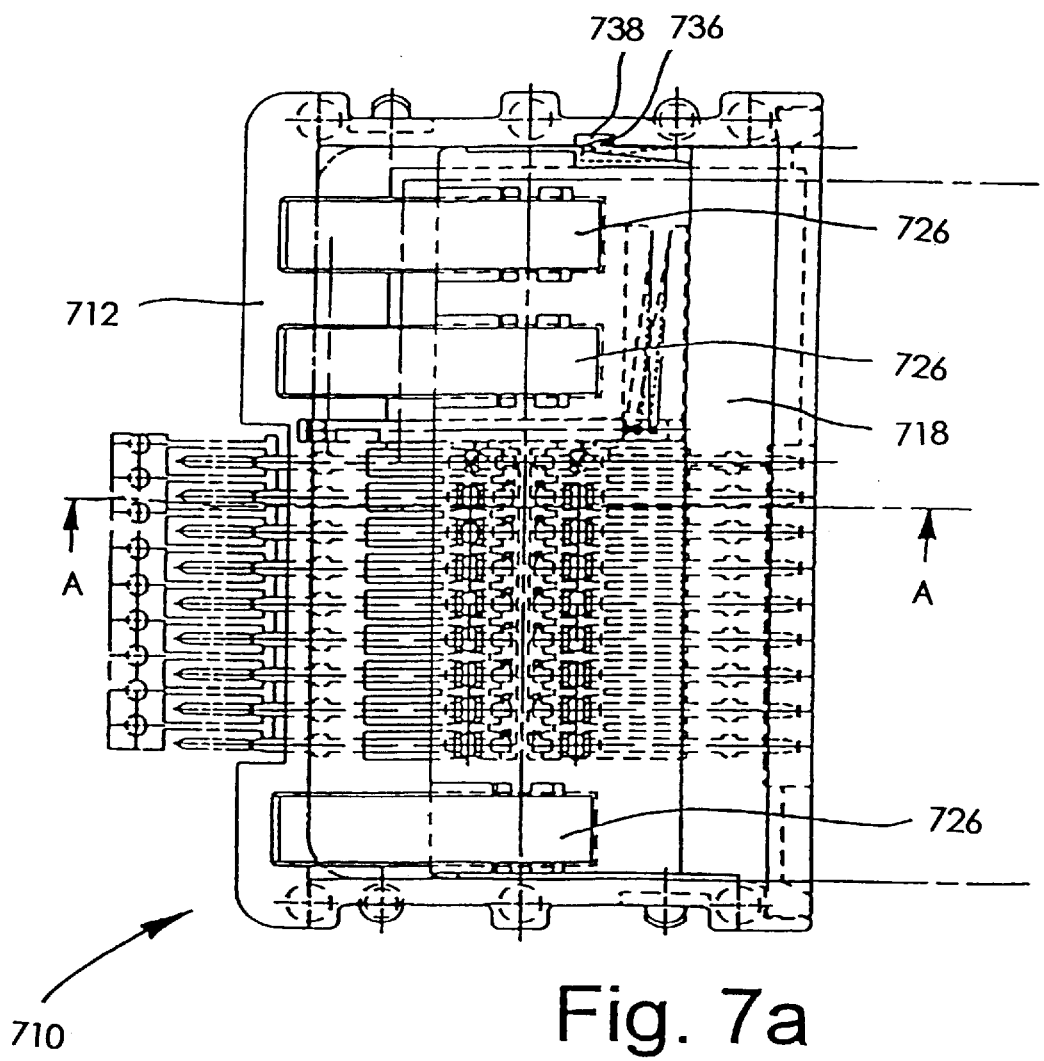
FIG. 7a is a top plan view of a chip card reading device according to a further embodiment of the present invention.

In FIGS. 7a and 7b, there is shown another embodiment of the present invention similar to the one shown in FIG. 6. Chip card reading device 710 comprises a frame 712 having an upward facing opening 714 (as seen in FIG. 7b) therein, and a cover 718 disposed within said opening 714 of said frame 712 and guided therein. Further, an insert slot 716 for a chip card C is provided in said frame 712. At least one and preferably three resilient arms 726 protrude into the opening 714 and, thus, into a receptacle for said chip card C formed by said frame 712 and said opening 714. Said resilient arms 726 are attached to said frame 712, and are preferably formed integrally with said frame 712. A ramp-shaped projection or boss 730 is formed at the distal end of each of said resilient arms 726.

When a chip card C is inserted into the chip card reading device 710, the cover 718 is engaged by said card and is moved along with said card under said resilient arms 726. The resilient arms 726 ride onto said cover 718 due to their ramp-shaped projection 730 and come to rest in a groove 732 on said cover 718 in order to establish a certain predetermined relative position of said frame 712 and said cover 718 this position being the end position of said cover 718.

In the end position of the cover 718 a detent tooth 736 on said cover 718 comes into engagement with a recess 738 in said frame 712 to lock said cover 718 against movement towards said insert slot 716, i.e. the cover 718 is locked against movement out of said chip card reading device. To remove the chip card from the chip card reading device 710, detent tooth 736 is moved out of engagement with said recess 738 in any conventional way to release the locking of the cover 718 in its end position. Thus, no other card locking mechanism is required.

When a chip card is inserted into the chip card reading device 710, the resilient arms 726 are flexed according to the thickness of the inserted chip card and press the chip card against bearing surface 724 and contact elements 736 of said chip card reading device 710 by means of the cover 718. The material and the thickness, or, in other words, the spring characteristics of the resilient arms 726 are chosen such that a chip card C having standard or double thickness may be inserted into the chip card reading device 710 and will be pressed against bearing surface 724 by said cover 718. When the chip card C abuts the bearing surface 724, contact pads provided on said chip card are pressed against said contacts of said reading device 710 applying a force of about 0.3 to 0.5N. Thus, also this embodiment a contacting force within the allowable range irrespective of the thickness of the chip card used.

It should be noted that in the embodiment shown in FIG. 7 the chip card is inserted from right to left. Therein, only a part of said chip card comprising the contact pads is inserted into the chip card reading device. The rest of the card extends out of the chip card reading device. However, a man skilled in the art could easily modify the cover 618 of this embodiment so it can be used in a chip card reading device as described in connection with FIGS. 1, 2 or 5 where the chip card is completely or almost completely inserted into the chip card reading device.

The present invention may also be carried out such that the contact elements of the chip card reading device are disposed on a support plate or a carrier which is pressed against the card like the cover in the above described embodiments. Also, a combination of a spring-biased or resilient cover and a spring-biased or resilient support plate is possible and will occur to a man skilled in the art upon reading the above disclosure. Such modifications of the present invention and equivalents are intended to be covered by the appended claims.

We claim:

1. A chip card reading device for chip cards and/or SIM cards having different thicknesses, comprising, a cavity within said frame which provides a receptacle for receiving said chip cards and/or SIM cards having different thicknesses, contact elements arranged to contact pads on said chip card when the chip card is inserted in said receptacle, a pressure plate, and resilient means having portions fixed with respect to said frame for pressing said chip cards and/or SIM cards having different thicknesses against said contact elements upon insertion into said receptacle, said resilient means including spring means for pressing said pressure plate against said chip cards and/or SIM cards in order to press said chip cards and/or SIM cards against said contact elements.

2. A chip card reading device as set forth in claim 1 wherein said pressure plate extends over the entire receptacle and is attached to said frame at two opposite edges of said pressure plate.

3. A chip card reading device as set forth in claim 1 wherein said pressure plate is rigid and extends over the entire receptacle and wherein spring means are provided for pressing said pressure plate against a chip card inserted into said chip card reading device.

4. A chip card reading device as set forth in claim 3 wherein said spring means comprises a leaf spring on either side of the frame, said leaf spring engaging pins projecting from said pressure plate and from said frame.

5. A chip card reading device as set forth in claim 3 wherein said rigid cover is ramp-shaped at its end facing the insert slot to facilitate inserting of the chip card.

6. A chip card reading device as set forth in claim 1 wherein said pressure means comprises a pressing plate and a spring rod, said spring rod engaging said frame and pressing said pressing plate into said receptacle.

7. A chip card reading device as set forth in claim 1 wherein said pressure means comprises a resilient pressure plate having a projection thereon facing away from the receptacle, and a resilient plate extending over said projection and biasing said pressure plate into said receptacle.

8. A chip card reading device as set forth in claim 1 wherein said resilient means comprises at least one resilient arm extending from said frame.

9. A chip card reading device as set forth in claim 8 wherein said resilient arm comprises a pressure roller rotatably supported at the distal end of said resilient arm.

10. A chip card reading device as claimed in claim 1, wherein said contact elements are mounted to said frame and protrude into said receptacle when no chip card is inserted, wherein said contact elements are resiliently displaced when a chip card is inserted to provide a contacting force of the contacting element against contact pads on said chip card, said contacting force being within a predetermined allowable range, wherein a bearing surface is provided on said frame against which the chip card can bear and which limits the displacement of the contract elements, and wherein said resilient means are provided for pressing said chip card against said bearing surface independently from the thickness of the chip card so that said chip card abuts said bearing surface.

11. A chip card reading device for chip cards having different thicknesses, comprising, a cavity within said frame which provides a receptacle for receiving a chip card, contact elements arranged to contact pads on said chip card when the chip card is inserted in said receptacle, and resilient means having portions fixed with respect to said frame for pressing said chip card against said contact elements upon insertion into said receptacle, wherein said resilient means comprises first spring means for providing a contacting force of said contacting elements against contact pads of said chip card when said chip card is inserted, and second resilient means including a resilient cover extending over the receptacle for pressing said chip card against a bearing surface of said chip card reading device, and wherein said second spring means provide a spring force in excess of the contacting force providing by said first spring means.

12. A chip card reading device as set forth in claim 11 wherein said first spring means comprises resilient contact elements projecting into the receptacle.

13. A chip card reading device as set forth in claim 11 wherein said resilient cover engages flanges on said frame on opposite sides of said receptacle.

14. A chip card reading device for chip cards having different thicknesses, comprising, a cavity within said frame which provides a receptacle for receiving a chip card, contact elements arranged to contact pads on said chip card when the chip card is inserted in said receptacle, and resilient means having portions fixed with respect to said frame for pressing said chip card against said contact elements upon insertion into said receptacle, wherein said resilient means comprises first spring means for providing a contacting force of said contacting elements against contact pads of said chip card when said chip card is inserted, and second resilient means for pressing said chip card against a bearing surface of said chip card reading device, and wherein said second spring means provide a spring force in excess of the contacting force providing by said first spring means, and wherein said second spring means comprises a rigid cover extending over the receptacle and a leaf spring on either side of the frame, said leaf spring engaging pins projecting from said cover and from said frame.

15. A chip card reading device as set forth in claim 1 wherein said rigid cover is ramp-shaped at its end facing the insert slot to facilitate inserting of the chip card.

16. A chip card reading device for chip cards having different thicknesses, comprising a cavity within said frame which provides a receptacle for receiving a chip card, contact elements arranged to contact pads on said chip card when the chip card is inserted in said receptacle, and resilient means having portions fixed with respect to said frame for pressing said chip card against said contact elements upon insertion into said receptacle, wherein said resilient means comprises first spring means for providing a contacting force of said contacting elements against contact pads of said chip card when said chip card is inserted, and second resilient means pressing said chip card against a bearing surface of said chip card reading device and wherein said second spring means provide a spring force in excess of the contacting force providing by said first spring means, and wherein said second spring means comprises a pressing plate and a spring rod, said spring rod engaging said frame and pressing said pressing plate into said receptacle.

17. A chip card reading device for chip cards having different thicknesses, comprising, a cavity within said frame which provides a receptacle for receiving a chip card, contact elements arranged to contact pads on said chip card when the chip card is inserted in said receptacle, and resilient means having portions fixed with respect to said frame for pressing said chip card against said contact elements upon insertion into said receptacle, wherein said resilient means comprises first spring means for providing a contacting force of said contacting elements against contact pads of said chip card when said chip card is inserted, and second resilient means for pressing said chip card against a bearing surface of said chip card reading device, and wherein said second spring means provide a spring force in excess of the contacting force providing by said first spring means, and wherein said second spring means comprises a pressure plate having a projection thereon facing away from the receptacle, and a resilient plate extending over said projection and biasing said pressure plate into said receptacle.

* * * * *